Patented Nov. 20, 1928.

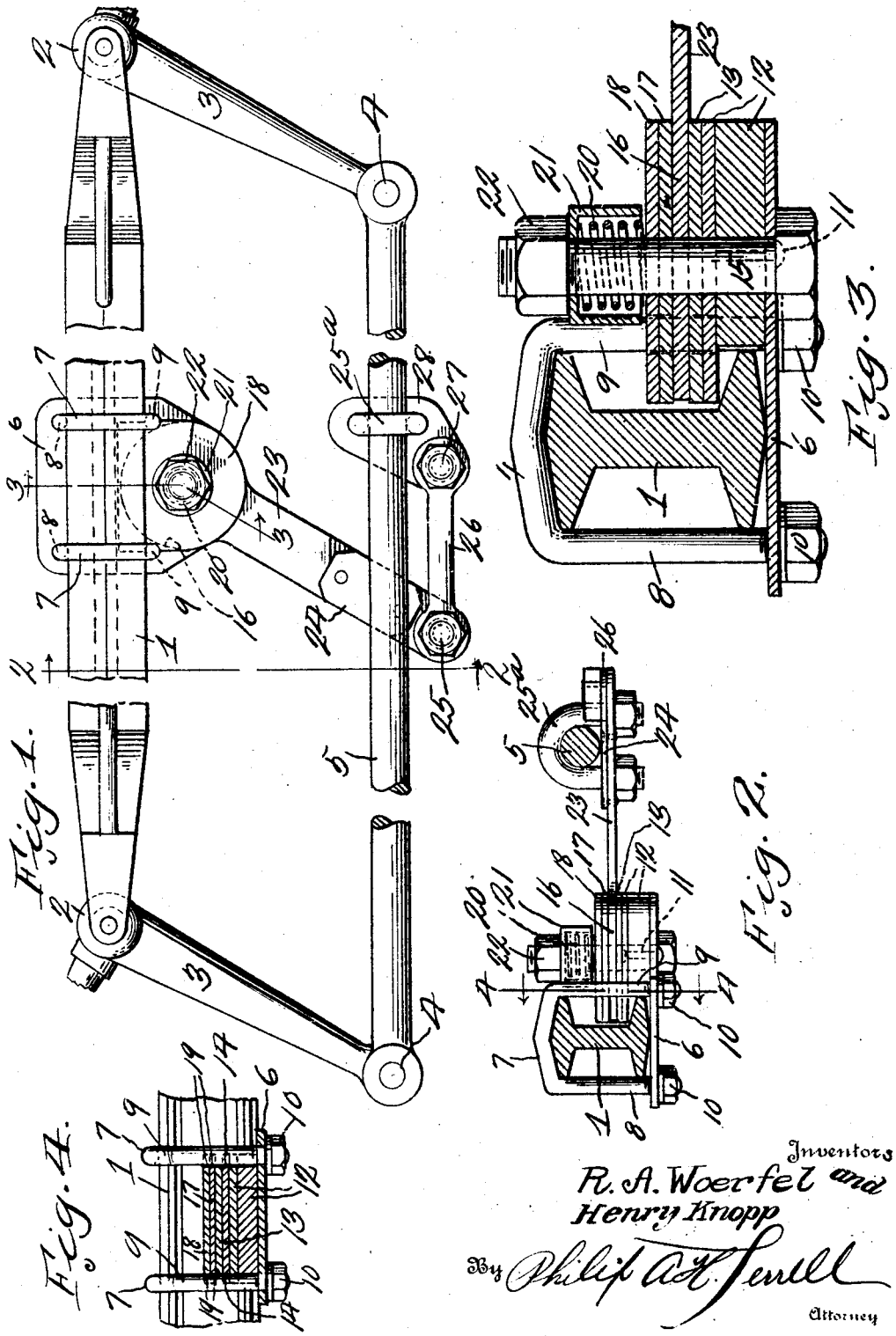

1,692,239

UNITED STATES PATENT OFFICE.

RUDOLPH A. WOERFEL AND HENRY KNOPP, OF SAWYER, WISCONSIN.

ANTIRATTLING DEVICE.

Application filed February 9, 1927. Serial No. 166,870.

The invention relates to antirattling devices for automobile steering mechanism and also a device which will prevent wobbling of the wheels incident to looseness or worn parts of the steering mechanism.

A further object is to provide an antirattling or antiwobbling device for automobile steering mechanisms comprising a member carried by the axle and to which member is pivotally connected an arm which underlies the connecting rod and frictionally engages the same, and has a link connection with a clamp carried by the connecting rod whereby during a steering operation the arm will move with the connecting rod in engagement therewith and prevent rattling of the parts. Also to provide friction means cooperating with the arms, which friction means will prevent wobbling of the wheels, but at the same time allow relatively easy pivotal movement of the spindles during a steering operation.

A further object is to provide the axle with U-bolts extending through a plate engaging the under side of the axle, a plurality of friction plates supported by said plate between arms of the U-shaped bolts, and which arms prevent rotation of the friction plate, a pivot bolt extending through all of said plates and a disc carried by the arm and adjustable spring means carried by the upper end of the pivot bolt and cooperating with the friction plate whereby the frictional holding of the arm disc may be varied for varying the amount of power necessary to pivotally move the arm for preventing rattling and wobbling.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of the device showing the same applied to a conventional form of axle and connecting rod.

Figure 2 is a transverse sectional view taken on line 2—2 of Figure 1.

Figure 3 is a detail sectional view taken on line 3—3 of Figure 1.

Figure 4 is a detail sectional view taken on line 4—4 of Figure 2.

Referring to the drawing the numeral 1 designates the axle of a conventional form of automobile, 2 spindles pivotally mounted in the ends of said axle, and which spindles are provided with spindle arms 3, the rear ends of which have pivotally connected thereto at 4 a connecting rod 5, all of which is conventional structure. It has been found that lost motion develops in steering mechanisms, which causes the wheels carried by the spindles 2 to wobble and also causes rattling of the parts. To obviate the above difficulty the device is primarily designed.

The anti rattling and wobbling device comprises a horizontally disposed plate 6 engaging the under side of the axle 1 and extending beyond the rear side of the axle, and which plate is held in position by inverted U-bolts 7, the arms 8 and 9 of which extend through the plate 6 and are provided with nuts 10, whereby the plate 6 may be securely clamped in position. Riveted or otherwise secured by means of rivets 11 to the upper side of the plate 6, rearwardly of the axle 1 are washers 12, which may be formed from any kind of material, for instance steel, and which washers have disposed thereon a fibre washer 13, which extends between the arms 9 of the U bolts 7 and has its opposite sides provided with recesses 14 for the reception of the sides of the arms 9 of the U-shaped bolts, whereby said washer will be held against pivotal movement on the pivot bolt 15 which extends through the washers 12 and also through the plate 6. Pivotally mounted on the bolt 15 and engaging the upper side of the washer 13, is a disc 16, which disc rotates between the arms 9 and is held in frictional engagement with the fibre washer 13 by means of a fibre washer 17 which is engaged by a steel washer 18. Washers 17 and 18 have their opposite sides provided with notches 19 in which the bolt arms 9 are disposed, therefore the washers 17 and 19 do not rotate with the disc 16, consequently the disc 16 is held in frictional engagement with the adjacent washers 13 and 17 by the expansive action of the spring 20 which surrounds the bolt 15 in the cup shaped housing 21. Threaded on the upper end of the pivot bolt 15 and cooperating with the housing 21 is a nut 22, and by means of which nut the expansive power of the expansion spring 20 may be varied for varying the frictional holding of the disc 16, for varying the amount of power necessary for moving the rearwardly extending arm 23 carried by the disc 16 for preventing wobbling of wheels carried by the spindles 2, and rattling of parts.

The arm 23 has secured to the upper side thereof a piece of material 24, which may be fibre, leather or any other material, and which piece of material slidably and frictionally engages the under side of the connecting rod 5 for preventing rattling of the connecting rod incident to looseness at the points 4 and adjacent mechanism. The arm 23 extends beyond the rear side of the connecting rod 5 and has pivotally connected thereto at 25 a transversely disposed link 26, which link is in turn pivotally connected at 27 to a plate 28, which engages the under side of the connecting rod and is securely clamped in position by means of the U-bolts 29, therefore it will be seen that during a steering operation, at which time the connecting rod 5 moves longitudinally, the frictionally held arm 23 will pivotally move to any position desired for holding the parts against a wobbling movement and with the member 24 in engagement with the connecting rod, rattling of the parts will be prevented, and at the same time the wheels will easily remain in the position moved until they are moved by the steering mechanism.

From the above it will be seen that an antirattling and antiwobbling device is provided for the steering mechanism of an automobile, which is positive in its operation, normally frictionally held, the frictional holding varied as desired and one which can be cheaply manufactured and can be applied to a conventional form of automobile without varying the construction thereof.

The invention having been set forth what is claimed as new and useful is:—

The combination with an axle, a connecting rod disposed adjacent one side of said axle, of an antirattling and wobbling device, said device comprising a bracket carried by the axle, an arm pivotally connected to the bracket, means for frictionally holding said arm at its pivotal point, said arm slidably and frictionally engaging one side of the connecting rod, a bracket carried by the connecting rod spaced from the arm and a link connection between said last named bracket and the arm.

In testimony whereof we hereunto affix our signatures.

RUDOLPH A. WOERFEL.
HENRY KNOPP.